(12) United States Patent
Manuvinakurike et al.

(10) Patent No.: US 10,453,455 B2
(45) Date of Patent: Oct. 22, 2019

(54) MULTIPLE TURN CONVERSATIONAL TASK ASSISTANCE

(71) Applicant: Adobe Inc., San Jose, CA (US)

(72) Inventors: Ramesh Radhakrishna Manuvinakurike, Los Angeles, CA (US); Trung Huu Bui, San Jose, CA (US); Walter W. Chang, San Jose, CA (US)

(73) Assignee: ADOBE INC., San Jose, CA (US)

( * ) Notice: Subject to any disclaimer, the term of this patent is extended or adjusted under 35 U.S.C. 154(b) by 57 days.

(21) Appl. No.: 15/820,874

(22) Filed: Nov. 22, 2017

(65) Prior Publication Data
US 2019/0156822 A1  May 23, 2019

(51) Int. Cl.
| | | |
|---|---|---|
| G10L 15/22 | (2006.01) |
| G10L 25/57 | (2013.01) |
| G10L 15/26 | (2006.01) |
| G10L 15/06 | (2013.01) |
| G10L 25/87 | (2013.01) |
| G10L 15/04 | (2013.01) |
| G06F 3/16 | (2006.01) |
| G10L 25/78 | (2013.01) |

(52) U.S. Cl.
CPC ............. *G10L 15/22* (2013.01); *G06F 3/167* (2013.01); *G10L 15/04* (2013.01); *G10L 15/063* (2013.01); *G10L 15/265* (2013.01); *G10L 25/57* (2013.01); *G10L 25/78* (2013.01); *G10L 25/87* (2013.01); *G10L 2015/223* (2013.01)

(58) Field of Classification Search
CPC ....................................................... G10L 15/22
USPC ........................................................ 704/235
See application file for complete search history.

(56) References Cited

U.S. PATENT DOCUMENTS

| | | | |
|---|---|---|---|
| 6,421,655 B1 * | 7/2002 | Horvitz .................... G06N 5/04 706/61 |
| 7,103,553 B2 * | 9/2006 | Applebaum ........ G10L 15/1822 704/235 |
| 2018/0039618 A1 * | 2/2018 | Kumar .................. G06F 3/0482 |
| 2018/0218728 A1 * | 8/2018 | Manuvinakurike ... G10L 15/063 |

* cited by examiner

*Primary Examiner* — Susan I McFadden
(74) *Attorney, Agent, or Firm* — Finch & Maloney PLLC

(57) ABSTRACT

A technique for multiple turn conversational task assistance includes receiving data representing a conversation between a user and an agent. The conversation includes a digitally recorded video portion and a digitally recorded audio portion, where the audio portion corresponds to the video portion. Next, the audio portion is segmented into a plurality of audio chunks. For each of the audio chunks, a transcript of the respective audio chunk is received. Each of the audio chunks is grouped into one or more dialog acts, where each dialog act includes at least one of the respective audio chunks, the validated transcript corresponds to the respective audio chunks, and a portion of the video portion corresponds to the respective audio chunk. Each of the dialog acts is stored in a data corpus.

15 Claims, 8 Drawing Sheets

MULTIPLE TURN CONVERSATIONAL TASK ASSISTANCE

FIELD OF THE DISCLOSURE

This disclosure relates generally to digital audio/video processing, and more particularly, to multiple turn conversational task assistance using digital audio/video data.

BACKGROUND

Conventional techniques for performing tasks with a computing device rely on mechanical input devices, such as a keyboard, mouse, touch-sensitive screen, trackball, stylus, light pen or joystick. Such input devices are typically operated manually, either by hand or via an assistive mechanism designed for users with physical impairments. As an alternative to mechanical input devices, natural language user interfaces can be used to convert spoken queries into commands that are processed by the computer using voice and context recognition algorithms rather than by keying in commands through traditional input devices. Such user interfaces allow the user to interact with the computer in a more natural manner as one might have a conversation with another person. However, conventional techniques are limited by the extent of their programming and often have difficulty providing accurate or relevant responses to queries that are not anticipated by the system.

Complex tasks are sometimes distributed among many individuals or organizations using a crowdsourcing development model. With crowdsourcing, many small, repetitive and tedious tasks can be performed in parallel by a large number of individual contributors, which speeds up production and reduces costs when compared to traditional systematic and highly structured processes. Typically, crowdsourcing is used to gather and combine a diverse set of ideas for solving a particular problem into a single, cohesive solution.

BRIEF DESCRIPTION OF THE DRAWINGS

The accompanying drawings are not intended to be drawn to scale. In the drawings, each identical or nearly identical component that is illustrated in various figures is represented by a like numeral.

DETAILED DESCRIPTION

Overview

Figure 1:
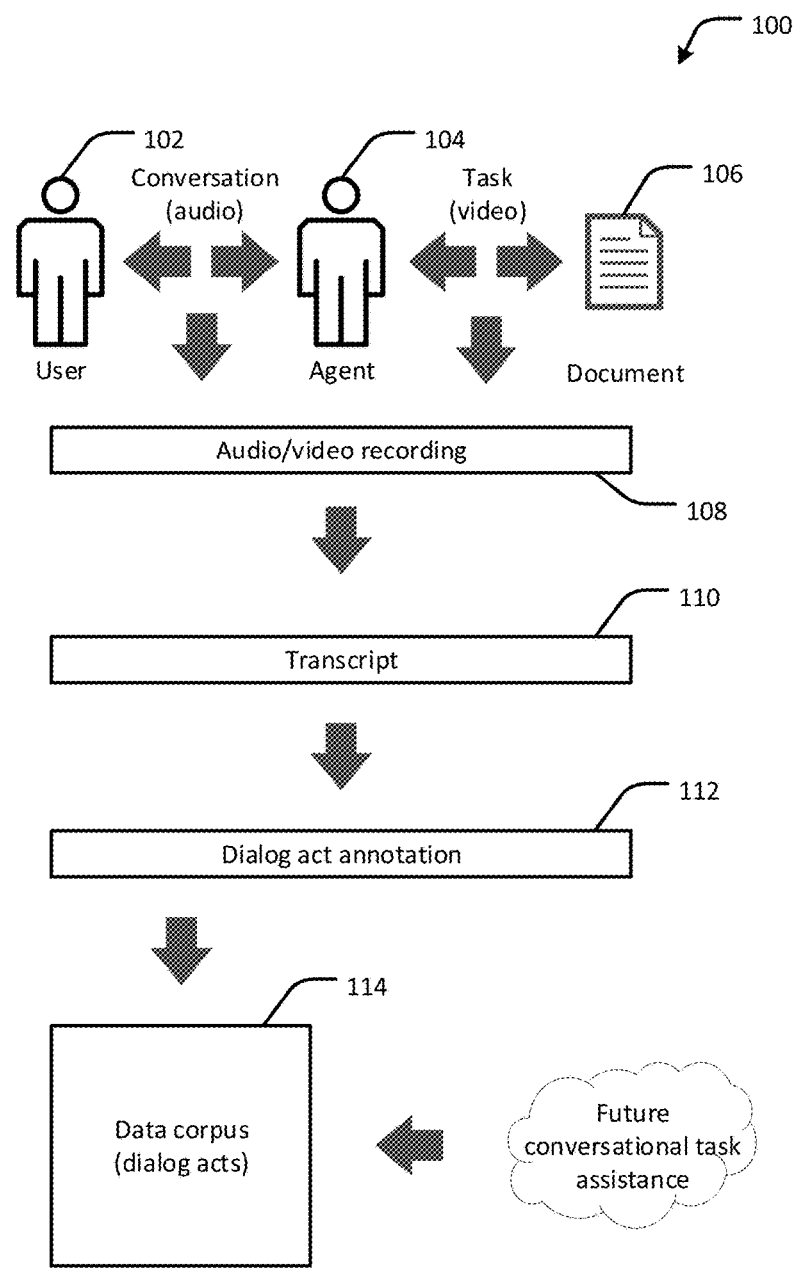
FIG. 1 shows an example framework for multiple turn conversational task assistance, in accordance with an embodiment of the present disclosure.

In accordance with an embodiment of the present disclosure, techniques are provided for multiple turn conversational task assistance using artificial intelligence (AI) to automatically recognize and respond to human speech. The term "conversational task assistance," as used in this disclosure, refers to the ability of a user to receive assistance with the performance of various tasks through a natural language conversation with an agent, which can automatically interact with the user and perform the tasks on behalf of the user in response to the user's verbal inputs. The term "multiple turn conversation," as used in this disclosure, refers to a conversation where at least one participant issues more than one query, command or request, such as described in further detail below.

The degree to which any AI system is useful, robust and reliable depends on the quantity and quality of the data used for training the system to perform its functions. Within the context of conversational task assistance, the system can be trained using samples taken from representative multiple turn conversations between users and agents. For example, a sample conversation, in which the agent edits a digital image for the user, can be memorialized in the form of a digital audio/visual (A/V) recording of the conversation. The audio portion of the conversation is a recording of the verbal exchanges between the user and the agent, and the visual portion of the conversation is a video recording of the image editing process taking place during the verbal exchanges. This sample conversation can then be parsed, using Voice Activity Detection (VAD), into discrete components that individually or collectively represent a context in which a particular task or sequence of related tasks are performed.

This disclosure provides a framework for building a corpus of data that can be used to train a software agent to perform tasks on behalf of a user within the context of a multiple turn conversation. In particular, the data corpus can be constructed by collecting, transcribing, and annotating A/V content representing sample multiple turn conversations. Since a very large and potentially infinite number of unique multiple turn conversations are possible, a large number of samples must be prepared for adequately training the system to perform task assistance within the context of any conceivable multiple turn conversation. This is facilitated by crowdsourcing the collection, transcription, and annotation of the sample A/V content, which allows for the development of a rich and diverse collection of training data in a relatively rapid and inexpensive manner. It will be understood that the framework discussed in this disclosure can be generally expanded to include multiple turn conversations on any number of different subjects including but not limited to digital image editing without departing from the scope of the disclosed embodiments. Numerous configurations and variations will be apparent in light of this disclosure.

Generally, the agent assists the user with performing one or more computerized tasks via a series of queries and responses between the user and the agent that form a conversation. For example, the agent can interact with the user of an image editing application to create, obtain or modify images on behalf of the user. Increasingly, software agents are being used in place of people to perform various tasks. For instance, a software agent can be programmed to provide a natural language interface that allows a user speak to a computing device (as if speaking to another person) instead of, or in addition to, using a conventional input device. For example, a software agent can be programmed to respond to the verbal query "what time is it?" by displaying or audibly announcing the current time. Such query-response techniques are called single turn conversations when the context of the query is entirely defined by one or more keywords within a single query.

More sophisticated techniques, called multiple turn conversations, build a series of successive queries into increasingly context-specific responses. For example, the software agent can be programmed to respond to the following query-response sequence:

Query: "I'm looking for a restaurant that serves Mediterranean cuisine."

Response: "There are three restaurants near you that serve Mediterranean cuisine."

Query: "Which one is farm-to-table?"

Response: "Pita Place at 1000 First Street has farm-to-table items."

Query: "Please make a reservation for four at seven o'clock."

Response: "Your reservation for four at seven o'clock is confirmed. Pita Place has a business casual dress code and offers valet parking."

However, multiple turn conversations such as the one described above are difficult to achieve because the software agent must be trained in advance to recognize and respond to a wide variety of query-response sequences. Presently there is no established framework for training such agents, particularly in the field of image editing. Before training can occur, an audio/video recording received from one or more of the conversation participants must be transcribed. The software agent can use the transcript to match the audio/video content (e.g., spoken words and actions captured on video) to some computer-readable text or data that accurately represents the video content in the context of the audio conversation. For example, a piece of audio/video content showing a user changing the color of an object in an image editing application in response to the request of an agent may include a multiple turn audio conversation such as: [User]: "I think the ball should be red." [Agent]: "OK, let's change it to red." [Video shows agent changing color of ball to red.] The transcript for this conversation may, for example, include "[ACTION: Select ball object, change color of selected object to red]."

Existing solutions for training a multiple turn conversational task assistant require the entire audio recording to be transcribed using a transcription service or to be manually transcribed offline, which can be a time-consuming process. It would be faster to transcribe the entire audio recording if several transcribers each work on different portions of the audio at the same time (such as by crowdsourcing the transcription). However, existing services and offline tools are not conducive to crowdsource the transcription; that is, they are not set up to allow several different transcribers to transcribe a single piece of audio. Rather, the audio must be segmented prior to transcription so that the segments can be parceled out to several transcribers and annotators. Also, existing services and tools are not efficient as they require a lot of time to transcribe and annotate the data. Therefore, there is a need for semi-automated, crowdsource-style transcription techniques that can build a quality corpus of training data, which would save significant amounts of time and money.

To this end, and in accordance with an embodiment of the present disclosure, a technique for multiple turn conversational task assistance includes receiving data representing a recorded conversation between a user and an agent. While the user is typically a human and the agent is typically a software agent, both of the users can be human users conversing with each other, where the conversation including audio and video is recorded. In either case, data representing the conversation includes a video portion and an audio portion, where the audio portion corresponds to the video portion. For example, the conversation may include a video recording of a computer display with audio of the first or agent. However, conversation does not necessarily include a video portion, or the video portion may be blank. The recorded conversation represents one sample (among many others gathered through crowdsourcing techniques) that can be added to the data corpus for training the system.

As noted above, crowdsourcing is used to obtain transcriptions and annotations of the sample conversations for inclusion in the training data corpus. To facilitate this crowdsourcing, the recorded conversation is digitally segmented into discrete components (for example, individual words or phrases in the audio recording), which are then distributed to several transcribers who can independently generate transcriptions and annotations of the respective components. Timing information (for example, the starting and ending time positions of each component within the entire conversation) is appended to the components so that the respective transcriptions and annotations can be related to the overall context of the conversation. Segmentation begins by removing silent portions from the audio portion using VAD to produce a modified audio recording (without any silent portions). For example, the audio portion may include audible sounds interspersed with silence, such as the silence that occurs during a conversation when no one is speaking. VAD automatically separates audio above a threshold volume level from audio below the threshold volume level. While it is not necessary to remove the silent portions from the audio, doing so reduces the size of the recording that is subsequently processed, which also reduces processing time. The modified audio recording (with silence removed) is then segmented into two or more smaller audio chunks. For example, if the non-silent audio portion includes a series of spoken words or phrases, each spoken word or phrase (several consecutive words) can be segmented into separate audio chunks. VAD segments the audio using voice recognition to identify natural language words and phrases and separate each word or phrase into different audio chunks. The segmentation process eliminates the silence in the audio data and further splits the audio into small chunks, each typically a short duration (for example, between approximately two to five seconds). This chunking of the audio into smaller chunks allows the transcription task, described in further detail below, to be deployed to several users while also obtaining timing information from the audio. This timing information helps accelerate the process of transcription and annotation.

Next, for each of the audio chunks, a transcript of the respective audio chunk is received via crowdsourcing the transcription of each audio chunk to several transcribers. The transcript can be created by a human operator or using automated voice recognition. The transcript represents text corresponding to the content of the respective audio chunk. For example, if a given audio chunk includes the spoken word "draw," then the corresponding transcript can be the word "draw." In this manner, each audio chunk can be easily indexed or otherwise referenced directly via the transcript, rather than via the audio recording. In some cases, a validation of the respective transcript is also received. The validation can occur when a human operator verifies that the transcript is correct and appropriate for the corresponding audio chunk.

Next, each of the audio chunks is logically grouped into one or more dialog acts using annotations to identify the groupings. Again, the annotations are generated via crowdsourcing the audio chunks, along with the corresponding transcriptions, to several annotators. Each dialog act includes at least one of the respective audio chunks, the transcript corresponding to the respective audio chunks, and a portion of the video corresponding to the respective audio chunk. For example, a dialog act representing an "update" task may include audio chunks and corresponding transcripts of a user asking the agent to perform an update on a document. Each of the dialog acts can be annotated by a human operator. The annotations represent a description of an action or task that is associated with the respective dialog act.

The general framework discussed above will now be described in further detail.

Framework

FIG. 1 shows an example framework 100 for multiple turn conversational task assistance, in accordance with an embodiment of the present disclosure. A multiple turn, natural language, task assistance conversation can be conducted between a user 102 and an agent 104. The agent 104 may be a person or a computer capable of performing voice recognition. The conversation can include words and other sounds spoken (or generated) by the user 102, the agent 104, or both. In general, the user 102 converses verbally with the agent 104, which performs or assists with performing one or more tasks on behalf of the user 102, such as manipulating a document 106. The document 106 can be visible to the user 102 in real time as the agent 104 performs the tasks so that the dynamic nature of the conversation can be captured. In other words, as the agent 104 modifies the document 106, the user 102 can see the modifications as they occur, and provide further instructions or queries to the agent 104 as performance of the tasks progresses. For example, if the user 102 asks the agent 104 to add a color to an object in an image, and the agent 104 then adds the color, the user 102 can see the color being added and decide whether the change is acceptable or whether further changes are needed. The audio portion of the conversation is digitally recorded. An audio recording 108 of the conversation can be stored in a database for further processing, such as discussed in further detail below.

In some cases, video accompanying the conversation can also be digitally recorded to complement the audible portions of the conversation. The video can be included with the recording 108. Timing information is used to synchronize or otherwise relate the audio and video together, both within the original recording 108 as well as for use later when the recording 108 is segmented for crowdsourcing transcriptions and annotations. In general, the video shows the agent 104 performing the tasks. For example, if the agent 104 is performing a task on a computer, such as editing the document 106 using an image editing application, a video of the computer display can be recorded while the conversation progresses and as the tasks are performed to produce a visual record of the agent's actions. In the recording 108, the audio and video portions of the conversation are typically, but not necessarily, synchronized in time (for example, the video can intentionally be time-delayed with respect to the audio if desired).

During or after the conversation, a transcript 110 of the audio portion of the recording 108 is created. The transcript 110 includes text or computer-readable code that represents the content and context of the conversation. For example, if the user 102 says, "please change the color of the ball to red," the transcript 110 may include "change color of ball to red" or other suitable language that represents the corresponding portion of the conversation. The transcript 110 can be created manually by a human operator (e.g., by entering text via a keyboard) or by using automated voice recognition techniques. As will be discussed in further detail below, the audio portion of the recording 108 can be segmented into smaller portions, each of which receives a transcript 110.

After the audio has been transcribed, the recording 108 can be annotated with one or more dialog acts 112. The dialog acts 112 represent the tasks performed by the agent 104. For example, if the task is to change the color of a ball in a digital image to red, then the portion of audio from the conversation corresponding to this task can be annotated as "color change" or other suitable labels that represent the respective task. Thus, as a result, each portion of the audio recording 108 will have both a corresponding transcript 110 and dialog act annotation 112. The dialog act 112 can be created by the same user or computer that created the transcript 110, or the dialog act 112 can be created by a different user or computer, once the transcript 110 is complete. In this manner, the transcript 110 and the dialog act 112 can be generated at different times, or at different places, or by different users/computers.

After the recording 108 has been annotated into one or more dialog acts 112, the recording 108, the transcript 110 and the dialog acts 112 can be stored in a data corpus 114 for use in future task assistance conversations.

Figure 2:
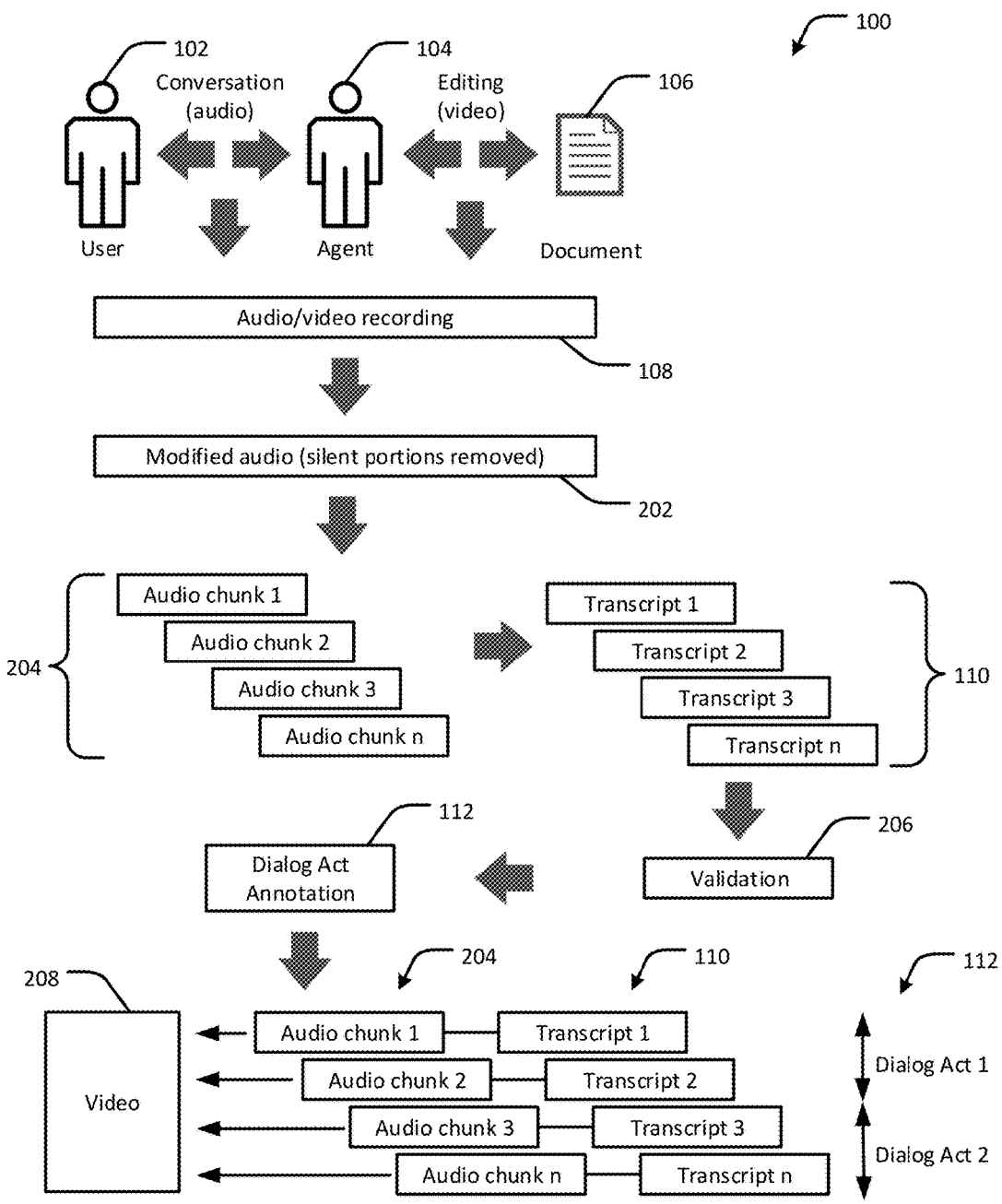
FIG. 2 shows further detail of the example framework for multiple turn conversational task assistance of FIG. 1, in accordance with an embodiment of the present disclosure.

FIG. 2 shows further detail of the example framework 100 for multiple turn conversational task assistance of FIG. 1, in accordance with an embodiment of the present disclosure. As discussed above, the audible, and in some cases, the visual portions of a conversation between the user 102 and the agent 104 are recorded to produce the audio/video recording 108. Next, silent portions are removed from the audio recording 108 using VAD to produce a modified audio recording 202. Silent portions are any parts of the recording 108 where either no voice is present or where the volume of the recording is too low to discern spoken words. After the silent portions are removed from the recording 108, the modified recording 202 contains the remaining non-silent portions of audio from the original conversation.

Next, the modified recording 202 is segmented into two or more audio chunks 204 using VAD. The audio can be segmented between spoken words, so that each chunk contains one or more words or phrases, by time, or a combination of both.

Next, each of the audio chunks 204 is transcribed to produce a corresponding transcript 110. There is one transcript 110 for each audio chunk 204. In some cases, each transcript 110 can be validated to produce a validated transcript 206. A validated transcript 206 can be produced by having a person compare the transcript 110 to the audio chunk 204 to ensure that the transcript 110 is accurate. While validation is not always necessary, it can be used to increase confidence that the audio chunk 204 was correctly transcribed.

Next, at least one of the audio chunks 204 and the corresponding transcript(s) 110 are annotated with one or more dialog acts to produce a dialog act annotation 112 of the conversation between the user 102 and the agent 104. The result is that a given dialog act 112 represents one or more audio chunks 204 and corresponding portions of the video 208, if any. The dialog acts 112 are stored along with the audio chunks 204 and video 208 in the data corpus 114.

System Architecture

Figure 3:
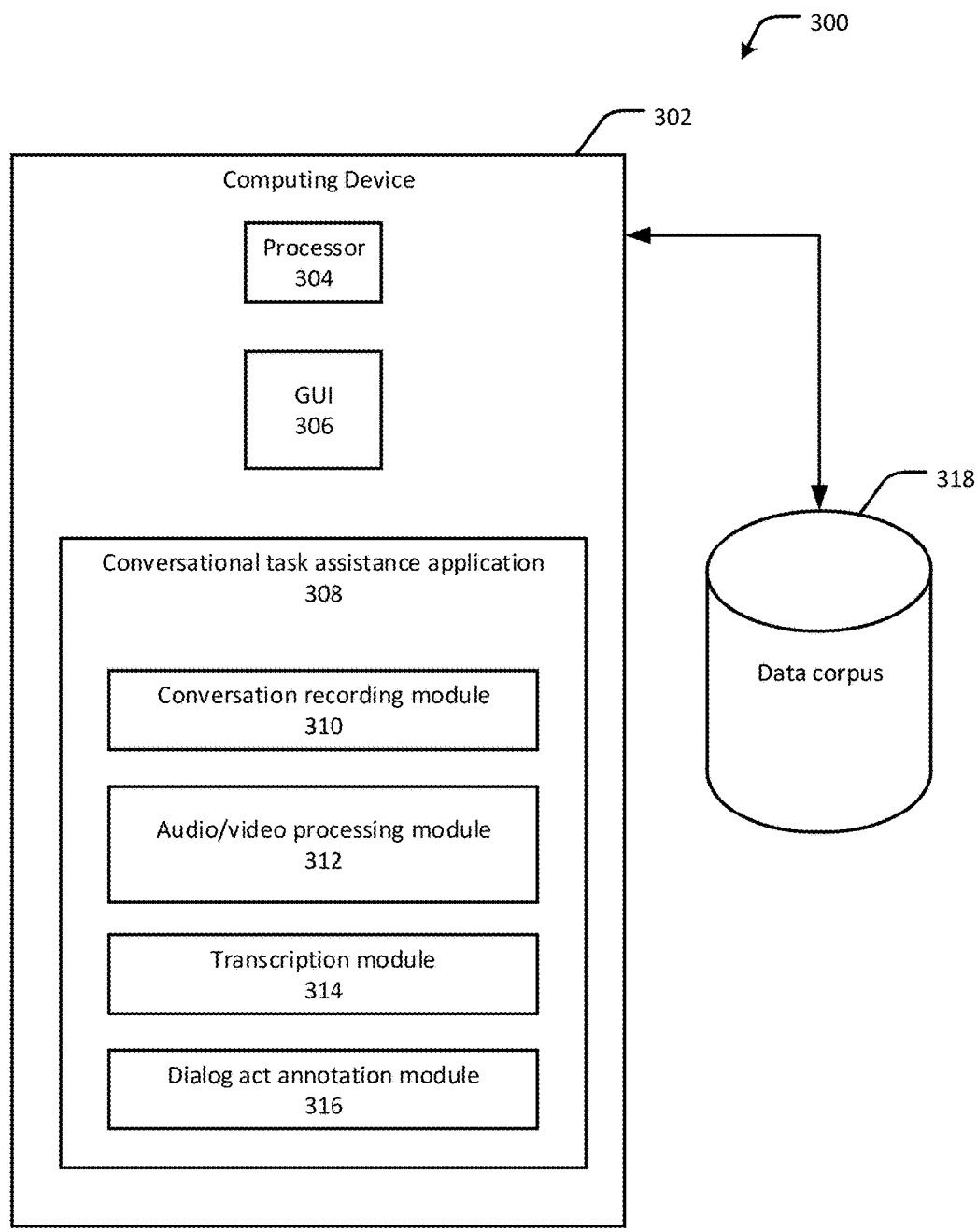
FIG. 3 shows an example system for multiple turn conversational task assistance, in accordance with an embodiment of the present disclosure.

FIG. 3 shows an example system 300 for multiple turn conversational task assistance, in accordance with an embodiment of the present disclosure. The system 300 includes a computing device 302 having a processor 304, a GUI 306, and a conversational task assistance application 308. The computing device 302 is configured to execute the application 308, which includes a conversation recording module 310, an audio/video processing module 312, a transcription module 314, a dialog act annotation module 316, or any combination of these. The computing device 302 is further configured to interact with a data corpus 318, which includes a database or other suitable data storage device. In some embodiments, the data corpus 318 is implemented on a back-end server that is remote from the computing device 302 and in communication with the computing device 302 over a network, such as the Internet or an intranet. The data corpus 318 can include any suitable digital storage device configured to store digitally encoded data. In some embodiments, the data represents digitally encoded documents, images, audio, video, or other information associated with the documents, images, audio or video.

As described in further detail below with respect to, for example, FIG. 4, the conversational task assistance application 308 is generally configured to perform one or more of the following functions: recording, collecting or otherwise receiving audio and video data representing a conversation between at least two users, segmenting the audio data into chunks, transcribing the audio in each chunk, and annotating each chunk with one or more dialog acts representing tasks associated with the respective audio chunk(s) and corresponding transcript(s). The audio chunk(s), transcript(s) and dialog act(s) are stored in a data corpus for use in future multiple turn conversational task assistance.

Example Methodology

Figure 4:
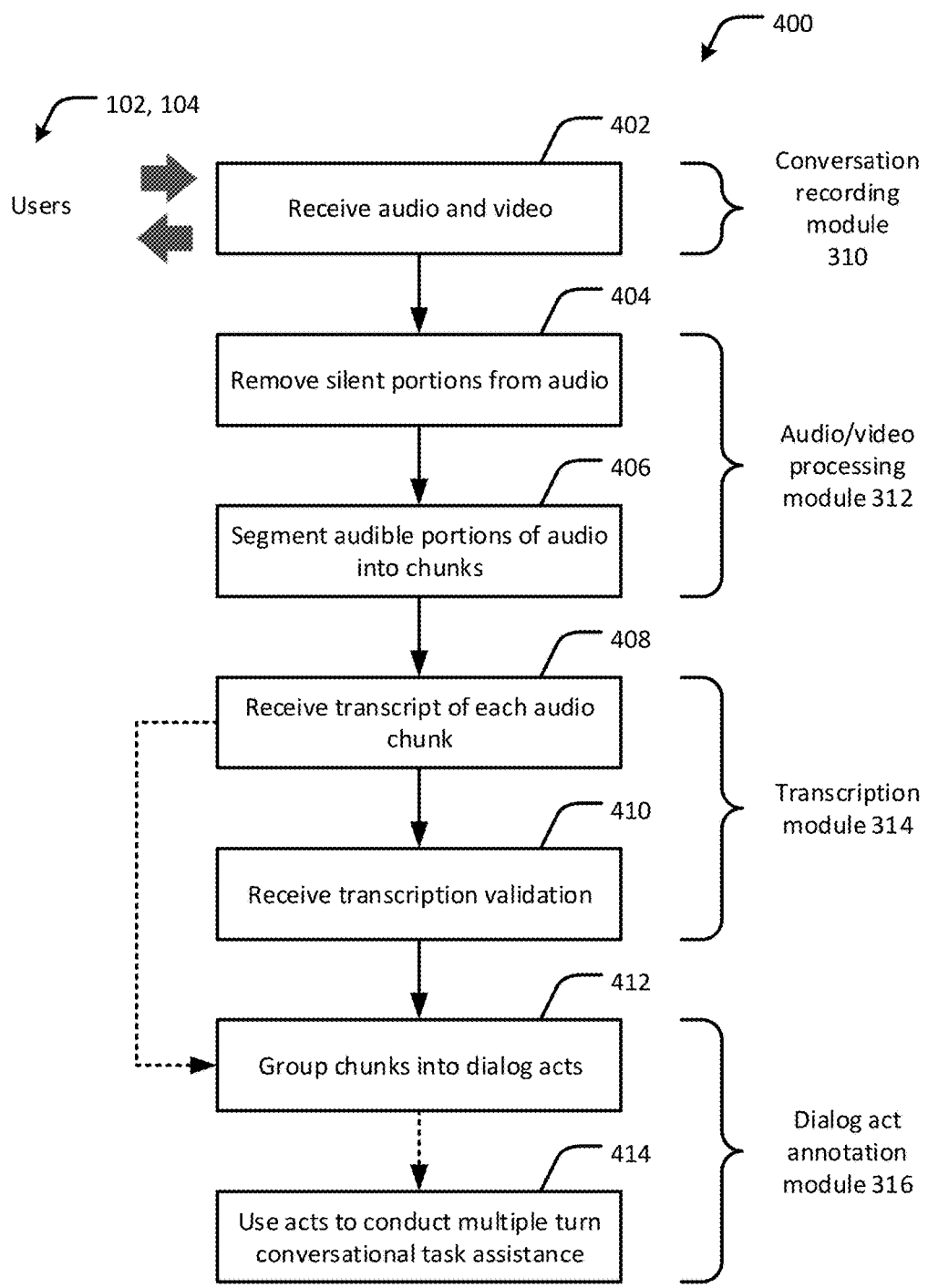
FIG. 4 is a flow diagram for a multiple turn conversational task assistance method, in accordance with an embodiment of the present disclosure.

FIG. 4 is a flow diagram for a multiple turn conversational task assistance method 400, in accordance with an embodiment of the present disclosure. All or portions of the method 400 can be implemented, for example, in the conversational task assistance application 308 of FIG. 3. Additionally, portions of the method 400 can be configured to receive user inputs and provide user outputs via the GUI 306 of FIG. 3.

The method 400 includes recording, collecting or otherwise receiving 402 audio and video data representing a conversation between at least two users 102 and 104. The receiving 402 of the audio and video data can be implemented in the conversation recording module 310 of FIG. 3. The received audio/video data includes a digital audio recording of a verbal conversation between the users 102, 104. For example, the audio portion of the recording may include verbal queries or commands from one user to another, responses to the queries or commands from one user to another, or other dialog between and among the users. The audio/video data, in some cases, also includes a digital video recording of one or more tasks being performed by at least one of the users 102, 104. For example, the video portion of the recording may include a screen capture of one or both of the users 102, 104 interacting with a computer, such as while manipulating a digital image using a digital image editing application.

The method 400 further includes removing 204 silent portions from the audio recording. The removing 404 of the silent portions can be implemented in the audio/video processing module 312 of FIG. 3. The audio recording may include periods of silence that naturally occur during the course of the conversation between the users. Once the periods of silence are removed from the audio recording, only the audible portions of the conversation remain. The method 400 further includes segmenting 406 the audible portions of the conversation into multiple audio chunks 204, where each audio chunk 204 includes one or more audible words or phrases within the conversation between the users.

The method 400 further includes receiving 408 a transcript of each audio chunk. The receiving 408 of the transcript can be implemented in the transcription module 314 of FIG. 3. The transcript includes text or other computer-readable code that represents the audible content of the chunk, or the context of the content within the conversation. For example, if the audio chunk is a recording of a user speaking, "open the document," the corresponding transcript for the audio chunk may include "open," "open document," or other suitable information. In some cases, the method 400 includes generating the transcript, although it will be understood that the transcript can be generated by an offline source or elsewhere and subsequently received from the other source. The transcript can be generated, for example, by receiving a user input (e.g., via a keyboard) or by using an audio-to-text conversion technique. An example GUI for generating a transcript is shown and described with respect to FIG. 6. In some embodiments, the method 400 further includes receiving 410 a validation of the transcript. The validation may, for example, be performed by a human operator, who checks the transcript for correctness. A transcript can, however, be used without validation if desired.

The method 400 further includes logically grouping 412 each audio chunk into a dialog act. The grouping 412 of the audio chunks into dialog acts can be implemented in the dialog act annotation module 316 of FIG. 3. A dialog act can include one audio chunk or a group of multiple audio chunks. Each dialog act also includes the transcript corresponding to the audio chunk(s) in the dialog act. The dialog act can be related to the video recording according to the audio chunk(s). The dialog act is a logical link between the group of audio chunk(s), the corresponding transcript(s), and video recording(s). For example, if a dialog act includes an audio chunk that begins 22 seconds from the start of the audio/video recording and ends 26 second from the start, then the dialog act can be used reference the portion the video recording from 22 seconds to 26 seconds. An example GUI 700 for annotating dialog acts is shown and described with respect to FIG. 7.

In some embodiments, the method 400 further includes using 414 the dialog acts to conduct future multiple turn conversational task assistance. The annotations of the dialog acts can be used to reference specific audio chunks and their corresponding video and transcription the next time a user wishes to obtain assistance with performing a task that is the same as or similar to those corresponding to the dialog acts previously stored in the data corpus 318. For example, if a user submits a query, "change the color of the ball [in a digital image]," then the data corpus 318 can be searched for an existing dialog act for changing the color of an object. The existing dialog act can then be used by an agent (human or machine) to assist the user in performing the requested task, for example, by providing audio/video instruction to the agent on how to perform the task.

Video Recording GUI

Figure 5:
FIG. 5 shows an example configuration of a graphical user interface (GUI) for recording video, in accordance with an embodiment of the present disclosure.

FIG. 5 shows an example configuration of a GUI 500 for recording video, in accordance with an embodiment of the present disclosure. The GUI 500 can be implemented as part of the GUI 306 of FIG. 3. As discussed above, the audio/video recording 108 can include both an audio portion and a video portion. The GUI 500 is configured to record at least the video portion of an agent 104 interacting with an application on behalf of a user 102, such as a digital image editing application shown in FIG. 5. For example, FIG. 5 shows an example application configured to enable editing of an image 502, as will be understood by one of skill in the art. As the agent 104 interacts with the GUI 500, such as by moving the mouse and cursor, selecting items in the application, and otherwise manipulating the image using the application, the interactions as displayed to the user 102 via the GUI 500 are also digitally recorded as part of the audio/video recording 108. In this manner, a video record of the interactions and tasks performed are preserved. At the same time, an audio portion of the audio/video recording 108 is produced. The audio can include a recording of a conversation (using, for example, a video chat application) between the user 102 and the agent 104 that is interacting with the GUI 500. In this manner, an audio record of the conversation is preserved along with the video record of the interactions with the GUI 500.

Transcription GUI

Figure 6:
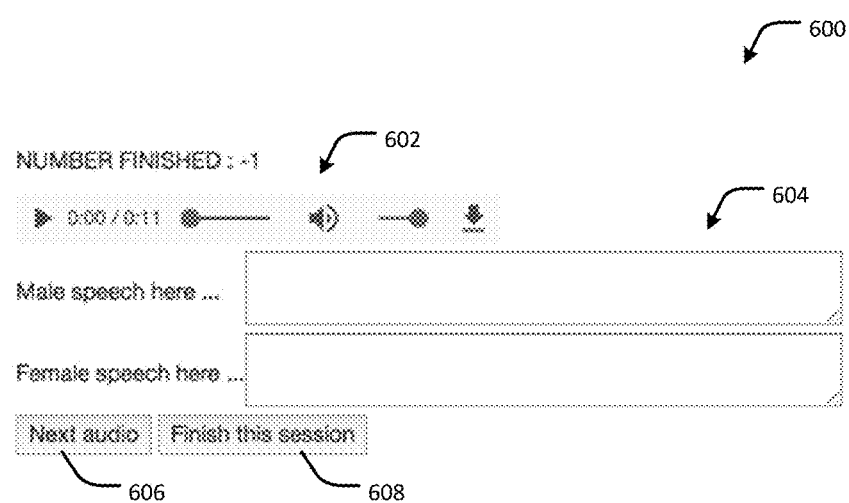
FIG. 6 shows an example configuration of a GUI for transcribing audio, in accordance with an embodiment of the present disclosure.

FIG. 6 shows an example configuration of a GUI 600 for transcribing audio, in accordance with an embodiment of the present disclosure. The GUI 600 can be implemented as part of the GUI 306 of FIG. 3. As discussed above, each audio chunk is transcribed. The GUI 600 is an example of an interface that can be used to generate the transcript. A playback control 602 is configured to play an audio chunk (including volume control) over a speaker so that a transcriber can hear the audio. The transcriber performing the transcription can different from the user 102 who speaks in the audio. The transcriber can then enter the transcript into a transcription entry field 604 (e.g., by typing text into the field). In some cases, there are two transcription entry fields 604, one for male speech and one for female speech. Once the transcript has been entered, the transcriber can advance to the next audio chunk using the next audio button 606 or finish the transcription session using the finish session button 608. The GUI 600 can also provide other information, such as the number of audio chunks that have been transcribed during a particular session, and the length of the audio chunk.

Dialog Act Annotation GUI

Figure 7:
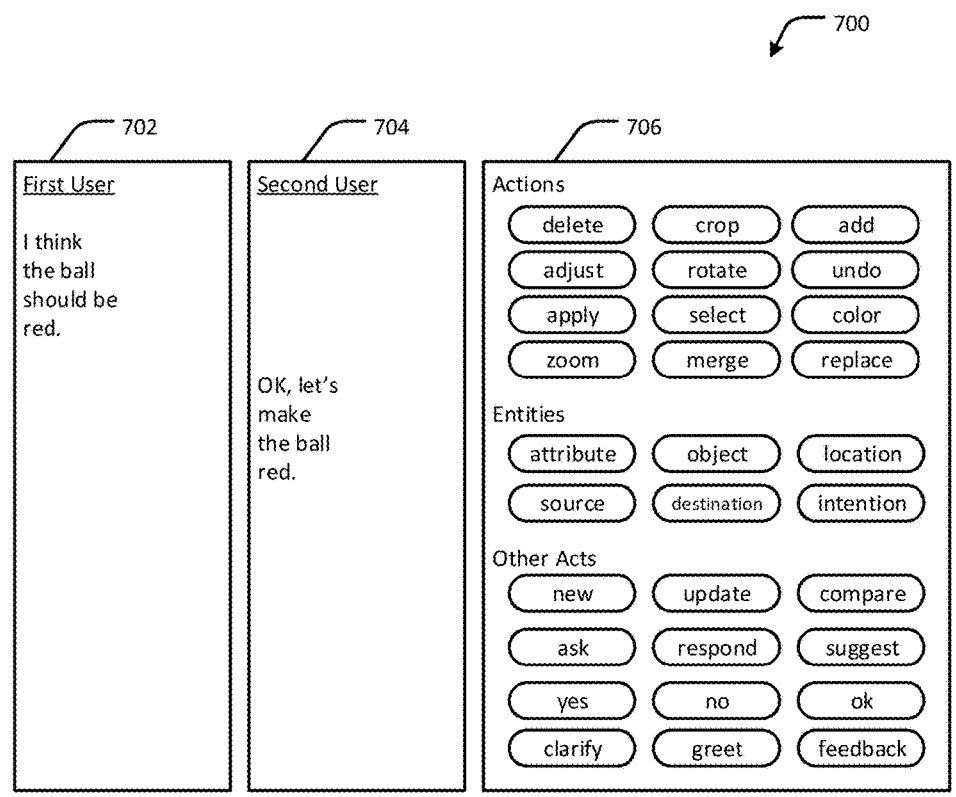
FIG. 7 shows an example configuration of a GUI for grouping and annotating dialog acts, in accordance with an embodiment of the present disclosure.

FIG. 7 shows an example configuration of a GUI 700 for grouping and annotating dialog acts, in accordance with an embodiment of the present disclosure. The GUI 700 can be implemented as part of the GUI 306 of FIG. 3. As discussed above, each audio chunk is grouped into a dialog act, which is then annotated. The GUI 700 is an example of an interface that can be used by an annotator to group the audio chunks and generate the annotation. The annotator performing the annotation can different from the user 102 who speaks in the audio. One portion 702 of the GUI 700 displays the transcript of a conversation for a user (i.e., a transcript of the user's 102 side of the conversation). The transcript is associated with an audio chunk. Another portion 704 of the GUI 700 displays the transcript of the conversation for an agent (i.e., a transcript of the agent's 104 side of the conversation). Yet another portion 706 of the GUI 700 includes one or more sets of annotation buttons that can be selected by a user via the GUI 700. The buttons can be grouped, for example, into actions, entities, and other acts, or any other suitable category. When the annotator selects one of the buttons, the text of the selected button is used to add (group) the corresponding audio chunk into a dialog act and to annotate the dialog act. For example, if the user says, "I think the ball should be red," the annotator can select the "color" action button to add the corresponding audio chunk into a dialog act, and to annotate the dialog act as "color." If the agent says, "OK, let's make the ball red," the annotator can select the "color" action button to annotate the corresponding audio chunk as the same "color" dialog act. In this manner, the "color" dialog act is associated with the audio chunks for both the user and the agent. Separately, but not shown in FIG. 7, the agent (e.g., the agent 104) interacts with a digital image editing application to change the color of the ball to red. The video recording of this interaction, which is mapped to the audio chunks in the "color" dialog act, becomes part of the "color" dialog act as well. Thus, in the future, if the user asks the agent to change the color of an object to red, the "color" dialog act can be retrieved from the data corpus and used to train the agent 104 to perform the color change task on behalf of the user. The GUI 700 can include any number and variety of such annotation buttons, and new buttons can be created as needed to accommodate additional dialog acts.

Computing Device

Figure 8:
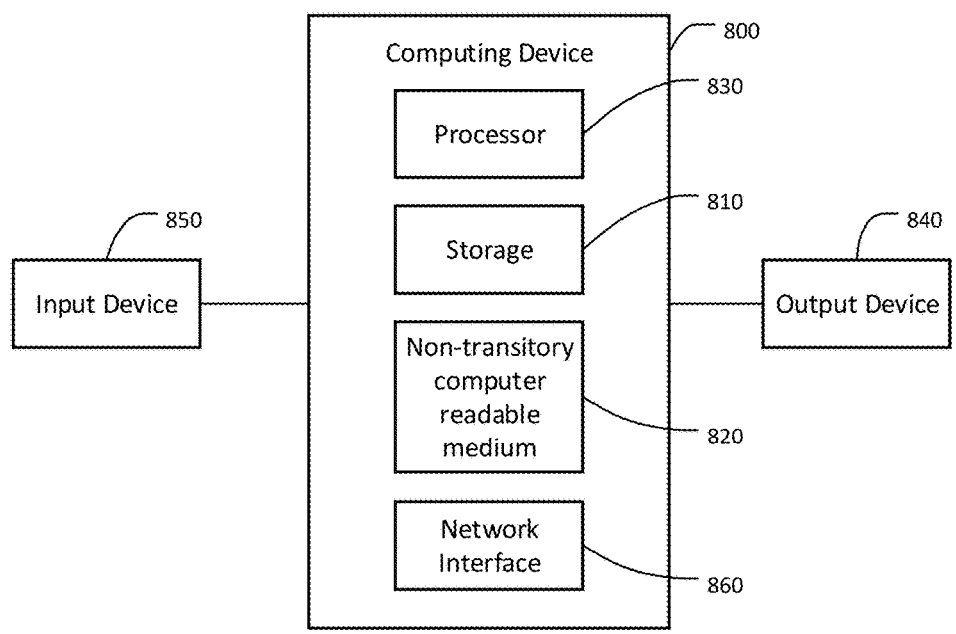
FIG. 8 is a block diagram representing an example computing device that may be used to perform any of the techniques as variously described in this disclosure.

FIG. 8 is a block diagram representing an example computing device 800 that may be used to perform any of the techniques as variously described in this disclosure. For example, the system 300 of FIG. 4, or any portions thereof, and the methodologies of FIG. 4, or any portions thereof, may be implemented in the computing device 800. The computing device 800 may be any computer system, such as a workstation, desktop computer, server, laptop, handheld computer, tablet computer (e.g., the iPad® tablet computer), mobile computing or communication device (e.g., the iPhone® mobile communication device, the Android™ mobile communication device, and the like), VR device or VR component (e.g., headset, hand glove, camera, treadmill, etc.) or other form of computing or telecommunications device that is capable of communication and that has sufficient processor power and memory capacity to perform the operations described in this disclosure. A distributed computational system may be provided including a plurality of such computing devices.

The computing device 800 includes one or more storage devices 810 or non-transitory computer-readable media 820 having encoded thereon one or more computer-executable instructions or software for implementing techniques as variously described in this disclosure. The storage devices 810 may include a computer system memory or random access memory, such as a durable disk storage (which may include any suitable optical or magnetic durable storage device, e.g., RAM, ROM, Flash, USB drive, or other semiconductor-based storage medium), a hard-drive, CD-ROM, or other computer readable media, for storing data and computer-readable instructions or software that implement various embodiments as taught in this disclosure. The storage device 810 may include other types of memory as well, or combinations thereof. The storage device 810 may be provided on the computing device 800 or provided separately or remotely from the computing device 800. The non-transitory computer-readable media 820 may include, but are not limited to, one or more types of hardware memory, non-transitory tangible media (for example, one or more magnetic storage disks, one or more optical disks, one or more USB flash drives), and the like. The non-transitory computer-readable media 820 included in the computing device 800 may store computer-readable and computer-executable instructions or software for implementing various embodiments. The computer-readable media 820 may be provided on the computing device 800 or provided separately or remotely from the computing device 800.

The computing device 800 also includes at least one processor 830 for executing computer-readable and computer-executable instructions or software stored in the storage device 810 or non-transitory computer-readable media 820 and other programs for controlling system hardware. Virtualization may be employed in the computing device 800 so that infrastructure and resources in the computing device 800 may be shared dynamically. For example, a virtual machine may be provided to handle a process running on multiple processors so that the process appears to be using only one computing resource rather than multiple computing resources. Multiple virtual machines may also be used with one processor.

A user may interact with the computing device 800 through an output device 840, such as a screen or monitor, which may display one or more user interfaces provided in accordance with some embodiments. The output device 840 may also display other aspects, elements or information or data associated with some embodiments. The computing device 800 may include other input devices 850 for receiving input from a user, for example, a keyboard, a joystick, a game controller, a pointing device (e.g., a mouse, a user's finger interfacing directly with a touch-sensitive display device, etc.), or any suitable user interface, including a VR headset. The computing device 800 may include other suitable conventional I/O peripherals. The computing device 800 includes or is operatively coupled to various suitable devices for performing one or more of the aspects as variously described in this disclosure.

The computing device 800 may run any operating system, such as any of the versions of Microsoft® Windows® operating systems, the different releases of the Unix® and Linux® operating systems, any version of the MacOS® for Macintosh computers, any embedded operating system, any real-time operating system, any open source operating system, any proprietary operating system, any operating systems for mobile computing devices, or any other operating system capable of running on the computing device 800 and performing the operations described in this disclosure. In an embodiment, the operating system may be run on one or more cloud machine instances.

In other embodiments, the functional components/modules may be implemented with hardware, such as gate level logic (e.g., FPGA) or a purpose-built semiconductor (e.g., ASIC). Still other embodiments may be implemented with a microcontroller having a number of input/output ports for receiving and outputting data, and a number of embedded routines for carrying out the functionality described in this disclosure. In a more general sense, any suitable combination of hardware, software, and firmware can be used, as will be apparent.

As will be appreciated in light of this disclosure, the various modules and components of the system, such as the conversational task assistance application 308, the conversation recording module 310, the audio/video processing module 312, the transcription module 314, the dialog act annotation module 316, the GUI 306, or any combination of these, is implemented in software, such as a set of instructions (e.g., HTML, XML, C, C++, object-oriented C, JavaScript®, Java®, BASIC, etc.) encoded on any computer readable medium or computer program product (e.g., hard drive, server, disc, or other suitable non-transitory memory or set of memories), that when executed by one or more processors, cause the various methodologies provided in this disclosure to be carried out. It will be appreciated that, in some embodiments, various functions and data transformations performed by the user computing system, as described in this disclosure, can be performed by similar processors or databases in different configurations and arrangements, and that the depicted embodiments are not intended to be limiting. Various components of this example embodiment, including the computing device 800, may be integrated into, for example, one or more desktop or laptop computers, workstations, tablets, smart phones, game consoles, set-top boxes, or other such computing devices. Other componentry and modules typical of a computing system, such as processors (e.g., central processing unit and co-processor, graphics processor, etc.), input devices (e.g., keyboard, mouse, touch pad, touch screen, etc.), and operating system, are not shown but will be readily apparent.

Numerous embodiments will be apparent in light of the present disclosure, and features described herein can be combined in any number of configurations. One example embodiment includes a computer-implemented method of multiple turn conversational task assistance in a digital medium environment. The method includes receiving data representing a conversation between a user and an agent, the conversation including a digitally recorded video portion and a digitally recorded audio portion, where the audio portion corresponds to the video portion. The method further includes segmenting the audio portion into a plurality of audio chunks. The method further includes receiving, for each of the audio chunks, a transcript of the respective audio chunk. The method further includes logically grouping each of the audio chunks into one or more dialog acts, each dialog act including at least one of the respective audio chunks, the transcript corresponding to the respective audio chunks, and a portion of the video portion corresponding to the respective audio chunk. The method further includes storing each of the dialog acts in a data corpus. In some cases, the method includes removing silent portions from the audio portion to produce a modified audio portion, where the segmenting includes segmenting the modified audio portion into the plurality of audio chunks. In some cases, the method includes receiving, for each of the transcripts, a validation of the respective transcript. In some cases, the method includes receiving an annotation for at least one of the dialog acts, associating the annotation with at least one of the audio chunks grouped into the at least one dialog act, and storing the annotation in the data corpus. In some cases, the method includes providing a graphical user interface for recording at least the video portion. In some cases, the method includes providing a graphical user interface for generating the transcript. In some cases, the method includes providing a graphical user interface for the grouping of each of the audio chunks into the one or more dialog acts. Another example embodiment provides a non-transitory computer program product having instructions encoded thereon that when executed by one or more computer processors cause the one or more computer processors to perform a process such as set forth in this paragraph.

The foregoing description and drawings of various embodiments are presented by way of example only. These examples are not intended to be exhaustive or to limit the invention to the precise forms disclosed. Alterations, modifications, and variations will be apparent in light of this disclosure and are intended to be within the scope of the invention as set forth in the claims.

What is claimed is:

1. A computer-implemented method of multiple turn conversational task assistance in a digital medium environment, the method comprising:
   receiving data representing a conversation between a user and an agent, the conversation including a digitally recorded video portion and a digitally recorded audio portion, wherein the audio portion corresponds to the video portion;
   segmenting the audio portion into a plurality of audio chunks;
   receiving, for each of the audio chunks, a transcript of the respective audio chunk;
   providing a first graphical user interface for logically grouping each of the audio chunks into one or more dialog acts, each dialog act including at least one of the respective audio chunks, the transcript corresponding to the respective audio chunks, and a portion of the video portion corresponding to the respective audio chunk;
   receiving, from a user, an annotation for at least one of the dialog acts and associating the annotation with at least one of the audio chunks grouped into the at least one dialog act; and
   storing each of the dialog acts and the annotation in a data corpus.

2. The method of claim 1, further comprising removing silent portions from the audio portion to produce a modified audio portion, wherein the segmenting includes segmenting the modified audio portion into the plurality of audio chunks.

3. The method of claim 1, further comprising receiving, from the user and for each of the transcripts, a validation of the respective transcript.

4. The method of claim 1, further comprising providing a third graphical user interface for generating the transcript.

5. The method of claim 1, further comprising providing a second graphical user interface for recording at least the video portion.

6. A non-transitory computer readable medium having instructions encoded thereon that when executed by one or more computer processors cause the one or more computer processors to perform a process of multiple turn conversational task assistance, the process including
   receiving data representing a conversation between a user and an agent, the conversation including a digitally recorded video portion and a digitally recorded audio portion, wherein the audio portion corresponds to the video portion;
   segmenting the audio portion into a plurality of audio chunks;
   receiving, for each of the audio chunks, a transcript of the respective audio chunk;
   providing a first graphical user interface for logically grouping each of the audio chunks into one or more dialog acts, each dialog act including at least one of the respective audio chunks, the transcript corresponding to the respective audio chunks, and a portion of the video portion corresponding to the respective audio chunk;
   receiving, from a user, an annotation for at least one of the dialog acts and associating the annotation with at least one of the audio chunks grouped into the at least one dialog act; and
   storing each of the dialog acts and the annotation in a data corpus.

7. The non-transitory computer readable medium of claim 6, wherein the process includes providing a third graphical user interface for generating the transcript.

8. The non-transitory computer readable medium of claim 6, wherein the process includes providing a second graphical user interface for recording at least the video portion.

9. The non-transitory computer readable medium of claim 6, wherein the process includes removing silent portions from the audio portion to produce a modified audio portion, wherein the segmenting includes segmenting the modified audio portion into the plurality of audio chunks.

10. The non-transitory computer readable medium of claim 6, wherein the process includes receiving, from the user and for each of the transcripts, a validation of the respective transcript.

11. A system for multiple turn conversational task assistance, the system comprising:
    a storage; and
    a processor operatively coupled to the storage, the processor configured to execute instructions stored in the storage that when executed cause the processor to carry out a process including
    receiving data representing a conversation between a user and an agent, the conversation including a digitally recorded video portion and a digitally recorded audio portion, wherein the audio portion corresponds to the video portion;
    segmenting the audio portion into a plurality of audio chunks;
    receiving, for each of the audio chunks, a transcript of the respective audio chunk;
    providing a first graphical user interface for logically grouping each of the audio chunks into one or more dialog acts, each dialog act including at least one of the respective audio chunks, the transcript corresponding to the respective audio chunks, and a portion of the video portion corresponding to the respective audio chunk;
    receiving, from a user, an annotation for at least one of the dialog acts and associating the annotation with at least one of the audio chunks grouped into the at least one dialog act; and
    storing each of the dialog acts and the annotation in a data corpus.

12. The system of claim 11, wherein the process includes removing silent portions from the audio portion to produce a modified audio portion, wherein the segmenting includes segmenting the modified audio portion into the plurality of audio chunks.

13. The system of claim 11, wherein the process includes receiving, from the user and for each of the transcripts, a validation of the respective transcript.

14. The system of claim 11, wherein the process includes providing a second graphical user interface for recording at least the video portion.

15. The system of claim 11, wherein the process includes providing a third graphical user interface for generating the transcript.

* * * * *